May 30, 1950　　　　W. BILLETER　　　　2,509,472
CIRCUIT BREAKER WITH AIR DAMPING
Filed April 24, 1943
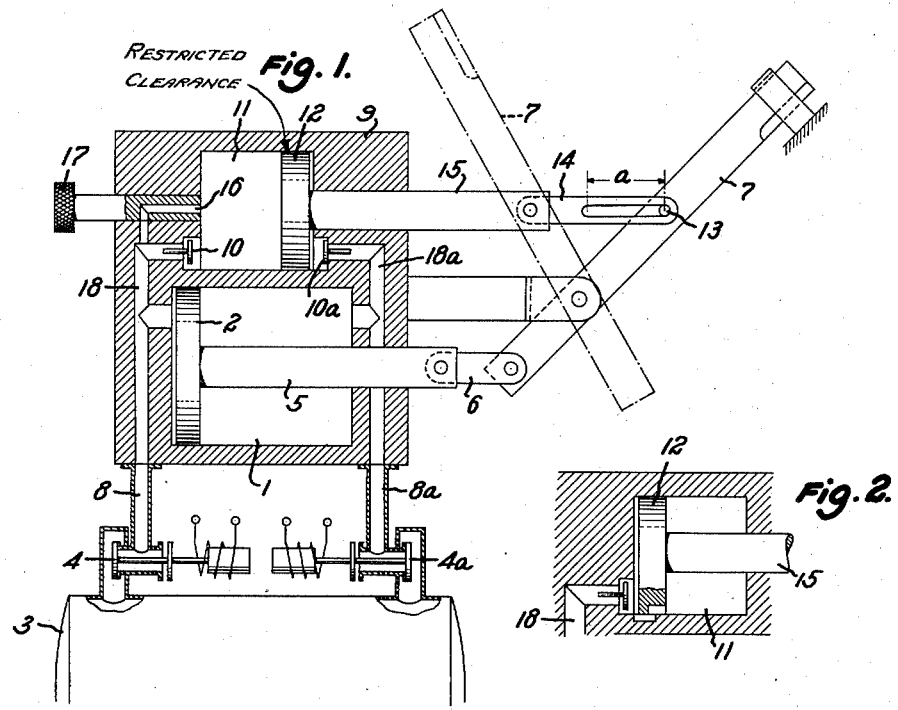
Fig. 1.
Fig. 2.
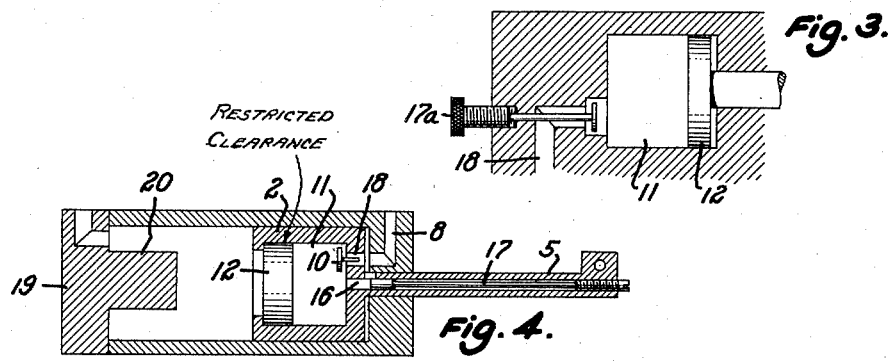
Fig. 3.
Fig. 4.
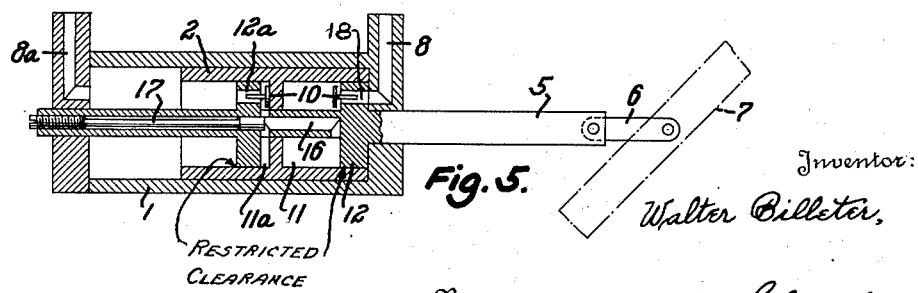
Fig. 5.
Inventor:
Walter Billeter,
By
Pierce & Scheffler,
Attorneys.

Patented May 30, 1950

2,509,472

UNITED STATES PATENT OFFICE 2,509,472

CIRCUIT BREAKER WITH AIR DAMPING

Walter Billeter, Baden, Switzerland, assignor to Aktiengesellschaft Brown Boveri & Cie., Baden, Switzerland Application April 24, 1943, Serial No. 484,399
In Switzerland February 20, 1942

Section 1, Public Law 690, August 8, 1946
Patent expires February 20, 1962

14 Claims. (Cl. 121—38)

With power circuit breakers, particularly those for high voltages, it is necessary that the disconnecting contacts should move at high speed between the "closed" and "open" end positions. Since it is especially important when closing the circuit breaker that the speed of the contacts should remain undiminished until shortly before the end position is reached, the energy of the moving masses must be dissipated over a relatively short path. This should, however, be achieved in such a manner that the contacts do not rebound and all oscillations resulting therefrom are avoided. Out of consideration for the mechanical stressing of the insulators care must be taken to keep the forces as small as possible. The fulfillment of these conditions is complicated still further with compressed air drives for circuit breakers by the fact that the available pressure for the drive may vary and thus also the kinetic energy which has to be absorbed at the end of the switching movement.

With known air damping devices the kinetic energy of the moving parts is absorbed by allowing the moving parts to act on a damping piston which compresses air inside a cylinder. The compression of air which is at atmospheric pressure, however, necessitates comparatively large cylinders if large forces at the end of the compression stroke and losses due to clearance gaps are not taken into account. Air damping devices using pre-compressed air in small damping cylinders have been constructed in such a manner that the compressed air for operating the driving piston is passed behind this latter and into the damping cylinder where it is further compressed during the switching movement. The filling of the damping space is then, however, largely dependent on external influences such as friction, additional load due to the formation of ice and the like, which also affect the speed of the driven system. The damping can for instance be too strong due to the retarding effect of such influences.

The present invention concerns a compressed air drive for circuit breakers with air damping for the moving masses before they reach their end positions, particularly for disconnecting switches. The characteristic feature of the invention is that the drive is so constructed that the compressed air is supplied simultaneously to the driving cylinder and to a damping cylinder with a piston inside of same, there being pressure equalisation between both cylinders, and the air is compressed in the damping cylinder by the kinetic energy of the moving masses. The effect of different driving pressures on the damping can thus be accurately compensated. The arrangement enables a practically oscillation-free control of for instance disconnecting switches to be obtained with strongly variable driving pressure and subjected to different external conditions such as friction and the like.

The objects and advantages of the invention will be apparent from the following specification when taken with the accompanying drawing in which:

Fig. 1 shows in diagrammatic form a compressed air drive where the driving piston is double-acting.

Figs. 2 and 3 show modifications of certain details of Fig. 1;

Fig. 4 shows a modified form of the invention for a single-acting drive;

Fig. 5 shows a further example of a double-acting drive.

In the constructional example shown in Fig. 1 the driving cylinder 1 with the driving piston 2 and the damping cylinder 11 with the damping piston 12 are arranged next to each other in a block 9. Both cylinders are supplied by valves 4, 4a with compressed air flowing through the bores 8, 8a from the reservoir 3. The damping cylinder is provided with non-return valves 10, 10a. Valves 4, 4a can be electrically controlled, as shown in the drawing. The driving piston 2 is connected to the switch blade 7 by means of the piston rod 5 and the link 6, the damping piston 12 being also connected to this switch blade by means of the driving pin 13, link 14 and piston rod 15. The pin 13 seats in a slot of the link 14 that permits the undamped initial movement of the drive piston 2. Passages 18, 18a act as pressure-equalizing connections between both cylinders 1 and 11 and must be so dimensioned that just before compression commences the same pressure prevails in cylinder 11 as in the working cylinder 1.

The switch blade 7 is shown in the closed position. In order to bring the blade into the open position indicated by the broken lines, valve 4 is opened whereupon compressed air flows simultaneously into the driving cylinder 1 and the damping cylinder 11. After the switch blade has travelled a distance $a$ it drives by means of pin 13 and lever 14 the damping piston 12 to the left end of the damping cylinder 11 at the same time compressing the air inside this cylinder.

The drive can be so designed that the moving parts come to rest shortly before the end position is reached. In order to prevent the switch blade from rebounding it is necessary to allow the compressed air to flow away rapidly from behind the piston 12. If the air is compressed to a very high pressure in a small space the leakage of air through the clearance space between the damping piston 12 and the cylinder 11 will be adequate. It is, however, an advantage to provide a special opening 16 in the damping cylinder through which a sufficient quantity of air can be discharged. If this opening 16 is fitted with a variable throttle 17, differences in piston clearance due to manufacturing tolerances can be compensated, if at least as much air can escape through the opening 16 as is lost due to the maximum piston clearance.

In view of the flexibility of the mechanically stressed elements it may be desirable that the damping piston should be brought to a standstill some considerable distance before the end position and then a correspondingly larger quantity of air allowed to flow out rapidly. This can be achieved by means of channels in the damping piston 12 and cylinder 11 which, as shown in Fig. 2, overlap in the end positions. The same purpose can be attained by valves which are opened before the piston reaches the end position by means of a controlling device actuated by the drive. For special purposes an opening 16 can be used in combination with the last-mentioned device for freeing the damping cylinder of air.

With the arrangement according to the invention the driving power in cylinder 1 and the damping power in cylinder 11 vary to the same extent when there is a change in pressure in reservoir 3. The pressure prevailing in the latter is thus unimportant for the fulfillment of the necessary conditions. If the switching speed alters due to external influences, such as friction or snow in the case of outdoor switches, the damping power will vary with the quantity of air which flows from the damping cylinder 11 through the leak opening 16. Due to a longer discharge of air from the damping cylinder when the moving mass is displaced at a reduced speed there will be a reduced amount of damping work to be done in order to press the piston 12 into the end position.

The discharge of air from the damping cylinder 11 can, as shown in Figs. 1–3, occur through the equalizing passage 18. In this case the non-return valve 10 can be adjusted by means of a regulating screw 17a (Fig. 3) so that it does not close completely. The air compressed in cylinder 11 will then only expand down to the pressure in the receiver 3. The driving piston 2 must then be so dimensioned that its driving power exceeds that of the damping piston in order to prevent the drive from running back after the switching operation has been completed.

A further constructional example of the invention is illustrated in Fig. 4. The drive in this case operates only in one switching direction. The driving piston 2 is hollow and serves as the damping cylinder for the damping-piston 12 which slides inside of same. The damping cylinder is filled through the pressure-equalizing passage 18 when compressed air is supplied to the working cylinder. Compression of the compressed air in cylinder 11 is effected by the action of the moving masses and the pressure on the working piston 2 after piston 12 abuts against the projection 20 on the cover of the working cylinder. A bore in the piston rod 5 serves as the discharge opening 16; its effective cross-sectional area can be adjusted by means of the regulating throttle 17 which can be operated from outside.

Fig. 5 shows a double-acting drive where the damping cylinder is also inside the working cylinder. The effective surface of the driving piston is thereby increased by the surface of the damping piston. The driving piston 2 includes a centrally located annular web slidable on the piston rod 5 and oppositely extending sleeve portions constituting two damping cylinders 11 and 11a each with a damping piston 12 and 12a respectively, both of which are located on the piston rod 5 for actuating the switch blade 7. When compressed air is supplied through the conduit 8, the check valve 10 in the piston 12 opens and the damping cylinder 11 fills with pressure air and the pistons 12, 12a together with piston 2 all move to the left. When driving piston 2 is stopped by the left hand cover of the main cylinder 1, the piston rod 5 and pistons 12, 12a continue their travel to the left in view of the kinetic energy of these moving parts and the associated switch elements, thereby momentarily increasing the pressure within the damping cylinder 11 and closing the check valve 10 in the piston 12. The compressed air acting upon the outer face of the piston 12 completes the movement of the piston rod 5 to the left, but this further movement takes place only to the extent that and as rapidly as the air compressed within the damping cylinder 11 can escape through leakage paths and through the bore 16 in the piston rod 5. The rate of flow of air from cylinder 11 to cylinder 11a through the bore 16 is controlled by the manually adjustable throttle 17. The air within the cylinder 11a has no damping effect during travel of the piston rod 5 towards the left, the cylinder acting merely as a lower pressure region to which pressure air escapes from the damping cylinder 11 through the bore 16 and leakage clearances. When the switch blade is to be operated in the opposite direction by movement of the piston rod towards the right upon the admission of pressure air through the conduit 8a, the damping cylinder 11a fills with pressure air during the initial and conjoint movement of the drive piston 2 and damping pistons 12, 12a, and the air is trapped within the damping cylinder 11a when the drive piston 2 seats on the right hand cover of the main cylinder 1 and piston rod 5 and associated elements continue in motion until their kinetic energy is absorbed by the further compression of the air within cylinder 11a. The final movement of piston rod 5 into its end position is effected, by air pressure on the outer face of the piston 12a, at a rate determined by the escape of the air from the damping cylinder 11a.

In the several arrangements shown, that side of the driving cylinder to which no air is being supplied is always freed from air.

I claim:

1. An air motor comprising a drive piston on a piston rod having means for connection to a driven device, a drive cylinder in which said drive piston is movable, a source of pressure air, means including valve-controlled conduits opening into the opposite ends of said drive cylinder for admitting pressure air to said drive cylinder to move the drive piston in opposite directions, and damping means operative upon a predetermined fractional displacement of the driven device in one direction to damp progressively the further displacement thereof; said damping means including a damping piston, means defining a damping cylinder in which said damping piston is movable, conduit means connecting said source of pressure air to said damping cylinder to establish therein the same pressure as that established on said drive cylinder, check valve means in said conduit means for trapping within said damping cylinder prior to relative movement between said damping piston and said damping cylinder air under the same pressure as that established in said drive cylinder, and relief means for the escape of pressure air from the high pressure end of said damping cylinder to permit movement of said driven device to an end position against the damping action of the air trapped in said damping cylinder.

2. An air motor as recited in claim 1, wherein said relief means comprises restricted clearance between said damping piston and said damping cylinder, whereby air trapped within an end of said damping cylinder by said check valve means may escape around said damping piston to the other end of said damping cylinder.

3. An air motor as recited in claim 1, wherein said relief means comprises a leakage port for venting pressure air from said damping cylinder, and means adjustable to restrict the venting of pressure air through said leakage port.

4. An air motor as recited in claim 1, wherein said drive piston is hollow and includes a sleeve portion, said sleeve portion constituting the damping cylinder within which said damping piston is movable.

5. An air motor as recited in claim 1, wherein said drive piston includes a central annular web slidable on said piston rod and oppositely directed sleeves constituting damping cylinders, and there are a pair of damping pistons secured to said piston rod and movable within the respective internal damping cylinders constituted by the sleeves of said drive piston.

6. A fluid pressure motor comprising a drive piston, a damping piston, means defining cylinders in which said pistons are movable, a driven member operated by said drive piston, a lost-motion connection between said driven member and said damping piston to effect relative movement between the damping piston and its cylinder after a predetermined displacement of said driven member, a source of fluid pressure, conduit means connecting said source to said cylinders to establish the same fluid pressure therein prior to the initiation of said relative movement of said damping piston and its cylinder, and leakage means for the escape of pressure fluid from the cylinder of the damping piston.

7. A fluid pressure motor as recited in claim 6, wherein a check valve is located in the conduit means for admitting pressure fluid to the cylinder of said damping piston, whereby the pressure within that cylinder may be increased to a value substantially higher than the fluid pressure within the cylinder of the drive piston.

8. A fluid pressure motor as recited in claim 6, wherein said means defining cylinders for said pistons comprises a block having parallel cylindrical bores in which said pistons are movable.

9. A fluid pressure motor comprising a drive piston, a damping piston, means defining cylinders in which said pistons are movable, a source of pressure fluid, conduit means connecting said source to said cylinders to admit pressure fluid simultaneously to said cylinders and substantially independently of each other to establish the same fluid pressure therein, a driven member operated by said drive piston, means mechanically coupled to said driven member and operative after a predetermined movement of said driven member to effect relative displacement between said damping piston and its cylinder against the fluid pressure within that cylinder, said damping piston having a restricted clearance within its cylinder to permit escape of pressure fluid around the damping piston, a leakage port for venting pressure fluid from the cylinder of said damping piston at a rate at least equal to the escape of pressure fluid around the damping piston, and means adjustable to restrict the venting of pressure fluid through said leakage port.

10. A fluid pressure motor comprising a drive piston, a damping piston, means providing cylinders in which said pistons are movable, a driven element operated by said drive piston, a lost motion connection between said driven element and said damping piston, a source of pressure fluid, and conduit means connecting said source to said cylinders, said conduit means to the cylinder individual to said damping piston being of substantially the same cross-sectional area as the conduit means to the cylinder individual to said drive piston to establish therein the same fluid pressure prior to the movement of said drive piston to take up the lost motion in said connection and initiate movement of the damping piston, whereby the damping effect varies with the fluid pressure on said drive piston.

11. In a fluid pressure motor, the combination with a drive piston, a damping piston, means including a piston rod connecting one of said pistons to a driven element, means defining cylinders in which said pistons are movable, and a source of pressure fluid and conduit means connecting said source to said cylinders to establish therein the same fluid pressure, of a check valve in said conduit means to trap pressure fluid within the cylinder of said damping piston, and leakage means including a passage through said piston rod for venting pressure fluid from the cylinder of said damping piston on displacement thereof by said drive piston.

12. In a fluid pressure motor, the invention as recited in claim 11, wherein said leakage means includes a manually adjustable element for regulating the rate of venting pressure fluid through said piston rod.

13. In a fluid pressure motor, a cylinder, a sleeve piston therein having an intermediate partition, a piston rod carrying a pair of damping pistons located within said sleeve piston and at opposite sides of the partition thereof, a driven element connected to said piston rod, conduits for admitting a pressure fluid to either end of said cylinder, check valves in said damping pistons for admitting pressure fluid from said cylinder into the internal cylinders within said sleeve piston at opposite sides of the partition of said sleeve piston, and a passage within said piston rod for the transfer of pressure fluid between said internal cylinders.

14. In a fluid pressure motor, the invention as recited in claim 13, in combination with manually adjustable means for regulating the rate of pressure fluid flow through said passage.

WALTER BILLETER.

REFERENCES CITED

The following references are of record in the file of this patent:

UNITED STATES PATENTS

| Number | Name | Date |
| --- | --- | --- |
| 850,583 | Howard | Apr. 16, 1907 |
| 1,680,091 | Desautels | Aug. 7, 1928 |
| 1,756,307 | Rowntree | Apr. 29, 1930 |
| 1,874,454 | Conklin | Aug. 30, 1932 |
| 1,998,873 | Kingsbury | Apr. 23, 1935 |
| 2,092,580 | Kelley | Sept. 7, 1937 |
| 2,113,161 | Osborne | Apr. 5, 1938 |